(No Model.)
F. ECAUBERT & H. SERRELL.
BACK PEDALING BRAKE.
No. 602,634. Patented Apr. 19, 1898.
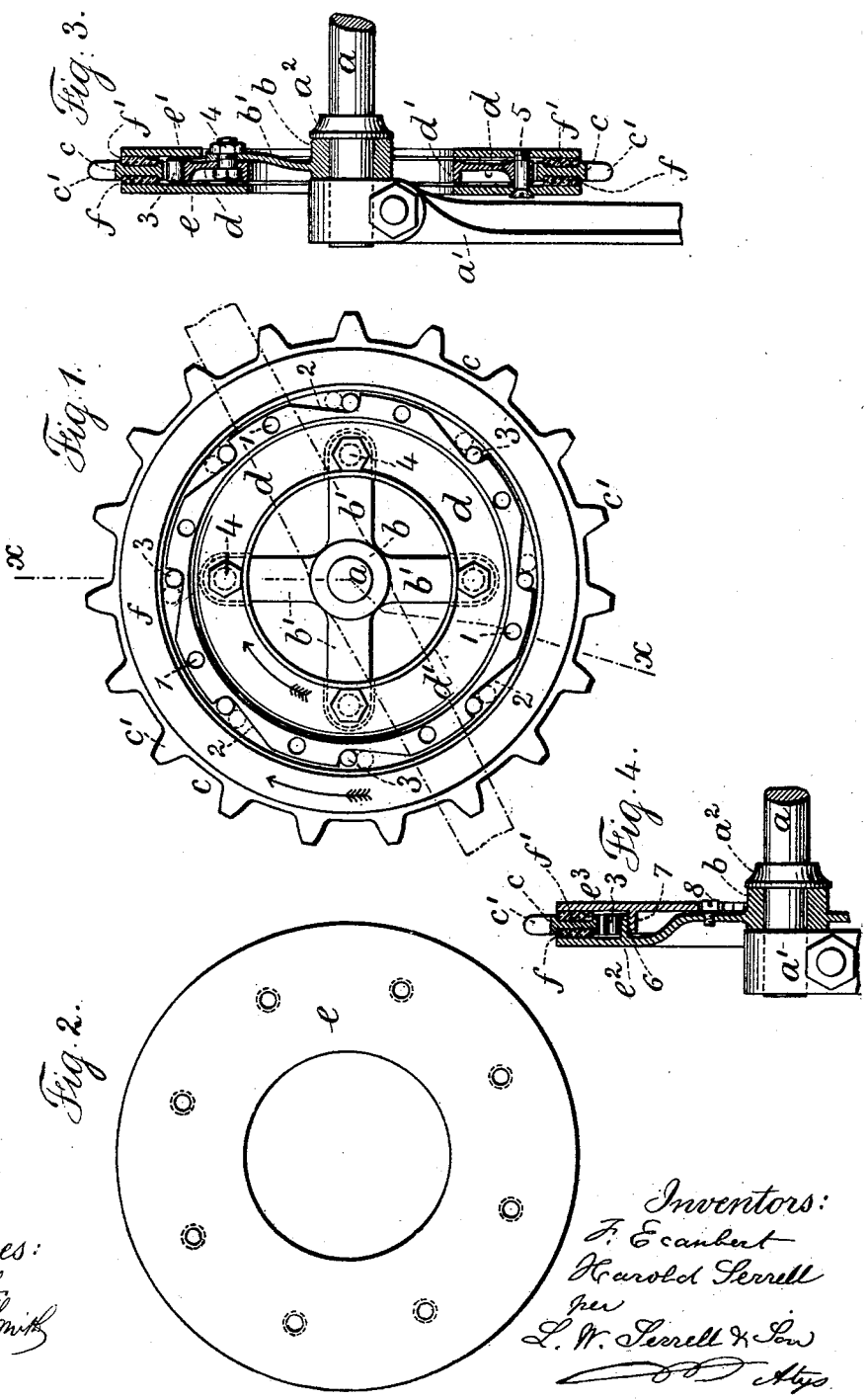
Witnesses:
J. Staib
Chas H Smith
Inventors:
F. Ecaubert
Harold Serrell
per
L. W. Serrell & Son
Attys

United States Patent Office.

FREDERIC ECAUBERT, OF BROOKLYN, NEW YORK, AND HAROLD SERRELL, OF PLAINFIELD, NEW JERSEY; SAID SERRELL ASSIGNOR TO SAID ECAUBERT.

BACK-PEDALING BRAKE.

SPECIFICATION forming part of Letters Patent No. 602,634, dated April 19, 1898.

Application filed June 1, 1896. Serial No. 593,729. (No model.)

*To all whom it may concern:*

Be it known that we, FREDERIC ECAUBERT, residing at Brooklyn, in the county of Kings and State of New York, and HAROLD SERRELL, residing at Plainfield, in the county of Union and State of New Jersey, citizens of the United States, have invented an Improvement in Bicycle Brake Mechanism, of which the following is a specification.

Brakes of various kinds have heretofore been employed upon bicycles. Those most usually employed have in one case operated against the front wheel and in another case against the rear wheel, both forms of brakes being usually operated by a handle-bar lever actuated by the hand of the rider.

The brake mechanisms heretofore in use have added much to the weight of the bicycle and to the number of parts to be kept clean, and while the necessity and advantage of a brake of some kind are generally acknowledged and conceded the disadvantages of those heretofore employed have resulted in their being quite universally abandoned in the present condition of the cycle industry.

The object of our invention is to provide a simple, light, and effective brake, one that quickly comes into operation and is as quickly released, and the operation of which is to retard or stop the rear wheel by the simple act of progressively holding back on the pedals and maintaining the same stationary, or nearly so, in order that the rider may control the cycle entirely by the feet, and as soon as the pedals are actuated to propel the cycle there is no action by the brake. These objects are accomplished by a frictional connection between the shaft and the sprocket-wheel, which connection is constant and continuously operative, and we employ a clutch mechanism operative in one direction and automatically separable by lessening the movement of one part in relation to the other, so as to permit the frictional connection to operate as a brake. The frictional connection is preferably adjustable, and the same operates to overcome the inertia of the rider and quickly stop the cycle.

In carrying out our invention we prefer to employ the following devices: external and internal rings in the same plane. The outer edge of the external ring is provided with sprocket-teeth and the inner edge is plain. The outer edge of the internal ring is provided with notches and inclines in which operate engaging rollers or similar devices. The internal ring is connected to the hub upon the crank-shaft of the bicycle. The opposite surfaces of the external ring are preferably recessed to hold rings of leather or similar material, and we provide disks upon the respective sides of the external ring to act against said ring, the same being connected together and by intervening devices to the axle. The inner faces of said disks adjacent to their peripheries bear upon the surfaces of said rings of leather or similar material to produce the aforesaid constant and continuously operative friction. The power to drive the machine is applied through the crank-shaft to the internal disk to turn the same and the sprocket-ring, and power in excess of the friction causes the various rollers to move up the inclines of the notches and engage and interlock with the inner face of the external ring and to thereby positively rotate said ring, the parts turning in unison and through the medium of the usual chain driving the bicycle forward.

If the rotation of the crank-shaft is stopped by a hold-back action of the feet arresting the pedals, the internal ring and the disks upon the respective sides thereof are also arrested and simultaneously therewith, and because of the momentum of the machine the rollers disengage from the surface of the external ring and pass down the inclines, so that said ring is free to revolve except as retarded or stopped by the frictional action of the disks against the leather rings or similar material that are upon the surfaces of said external ring. The degree of frictional contact is governed by the screws or bolts that hold together the disks and the internal ring.

In the drawings, Figure 1 is an elevation representing our improvement with one disk removed. Fig. 2 is an elevation of said disk. Fig. 3 is a vertical section at the line $x\,x$ of Fig. 1, and Fig. 4 represents a slightly-modified form of construction.

The axle $a$, crank $a'$, and ball-race cone $a^2$ are of usual construction, and the hub $b$ is received upon the axle between the crank and ball-race cone and is provided with arms $b'$.

The external ring is represented at $c$. Its outer edge is provided with sprocket-teeth $c'$ and its inner edge is plain. This ring is interchangeable with other rings of the same internal diameter, but having a greater or less number of teeth to increase or decrease the gear of the bicycle.

The internal ring is represented at $d$, and the outer edge thereof is provided at regular intervals with notches and inclines 2, in which are received rollers 3 or similar devices by which an engagement is effected between the internal ring and the inner face of the external toothed ring, whereby said notches, inclines, and rollers form a clutch to cause the rotation of the external ring by the internal ring when moving in one direction, and when the internal ring is stopped and maintained in a state of rest the continued rotation of the external toothed ring causes the rollers 3 or similar devices to move down the inclines and become disengaged. These movements are shown by the arrows in Fig. 1.

The internal ring $d$ is reduced in width and provided with rib $d'$, which is notched and provided with openings for attachment by bolts 4 to the arms $b'$ of the hub $b$. The head of the bolt 4 is received in the surface depression of the ring $d$ within the boundary of the rib $d'$.

Disks $e\ e'$ are employed upon the respective sides of the rings $c\ d$, and the same are connected together and to the ring $d$ by screws or bolts 5, passing through openings in the disks and openings 1 in the ring $d$.

We prefer to recess the surfaces of the ring $c$ and place therein rings of leather $f f'$ or similar material whose faces project beyond the surfaces of the ring $c$. The inner faces of the disks $e\ e'$ bear forcibly against the rings $f f'$ to produce a friction whose action comes into play when the external toothed ring $c$ is freed by the hold-back action of the feet upon the pedals stopping the internal ring $d$ by the pedals and crank-shaft, and the degree of friction is governed by the disks being drawn toward each other by the screws or bolts 5.

In the modification, Fig. 4, the disk $e^2$ is shown as in one with the hub $b$, or it may be directly connected thereto, and the internal ring having the notches and inclines for the rollers 3 is shown as upon the disk $e^2$. The inner face of this ring is screw-threaded at 6, and the disk $e^3$ has an annular flange 7, screw-threaded on its outer surface and meshing with the screw-thread 6, so that the two parts screw together to bring a pressure to bear upon the rings of leather or similar material $f f'$ and the sprocket-ring $c$. The inner periphery or edge of the disk $e^3$ is notched to receive the head of a screw 8, passing into the disk $e^2$, in connecting the parts. Upon the removal of the screw 8 the disk $e^3$ can be turned and tightened up to increase the friction and the screw inserted in the next notch to hold the parts in place.

In the practical use of our device the bicycle-rider, by the simple act of arresting the movement of the feet and stopping or retarding the rotation of the internal clutch-ring and disks and parts connected with the pedals, is enabled to stop short to check momentum in arresting the speed or to avoid accidents either on a level road or inclination or in descending a hill, and when desiring to dismount the rider can stop quickly in like manner and step off from either side, the frictional retarding action effecting a support by the pedal from which the dismount is made, the pedal maintaining its position. The power exerted by the bicycle-rider to effect this operation is best exerted when the cranks are approximately at right angles to an imaginary line drawn through the crank-shaft and weight center of the rider upon the saddle, and this condition is maintained in the operation of dismounting, enabling the rider to step off without danger before the wheel stops.

It is obvious that the clutch mechanism, as well as the frictional connection that operates as a brake between the shaft and sprocket-wheel, will operate identically the same when applied between a shaft and any form of wheel without departing from the object of our invention.

We claim as our invention—

1. The combination in a vehicle-driving mechanism, of a revoluble shaft or axle, a wheel and its support, friction devices constantly connecting the wheel and shaft, whereby the wheel is under constant friction while revolving with reference to the shaft, means for positively connecting the shaft and wheel to cause the wheel and shaft to revolve together in one direction, and means for releasing said positive connection when the wheel and shaft move relatively to each other, substantially as set forth.

2. The combination with the shaft and the wheel, of an adjustable frictional connection between the two, which connection is constant and continuously operative, and a clutch mechanism operative in one direction and automatically separable by lessening the movement of one part in relation to the other, so as to permit the frictional connection to operate as a brake, substantially as set forth.

3. In a bicycle, the combination with the devices for applying power and for driving the machine, of two rings in the same plane the one within the other, the inner ring having notches and inclines and devices therein adapted to act against the inner edge of the outer ring as a clutch to cause an engagement of the rings when the rotation is in one direction only, and means connected with the inner ring for applying a constant pressure and friction against the respective opposite faces of the outer ring for frictionally retarding the movement of the outer ring and stopping the same when the clutch is released, substantially as set forth.

4. In a bicycle, the combination with the devices for applying power and for driving the machine, of an exterior ring c having peripheral sprocket-teeth, and an internal ring d in the same plane, friction-rollers 3 in notches having inclines in the edge of the internal ring, disks upon the respective surfaces of the internal ring and connected thereto, and extending to receive between them the external ring, rings of leather or similar material between the side surfaces of the external ring and the inner surfaces of the disks for producing a friction to retard and stop the rotation of the external ring, substantially as and for the purposes set forth.

5. In a bicycle, the combination with the devices for applying power and for driving the machine, of an exterior ring c, having peripheral sprocket-teeth c', a plain inner surface and recesses in its opposite faces, an internal ring d in the same plane with the ring c, and having equidistant notches and inclines in the outer edge, friction-rollers 3 in said notches and acting between the inclines and the inner surface of the ring c to connect said rings, disks upon the opposite sides of said rings connected to the inner ring, rings of leather or similar material in the recessed faces of the external ring and against which the said disks bear frictionally to retard and stop the rotation of the external disk when freed from the engagement of the rollers 3, substantially as and for the purposes set forth.

6. The combination with the ring, of a central shaft and clutch mechanism within the ring for operatively connecting the parts in one direction only, a plate or disk at each side of the ring connected with the shaft and intervening friction-rings of suitable material, and means for pressing the plates continuously toward each other and against the ring for applying a constant friction to the ring, substantially as specified.

7. The combination with the pedals and shaft in a cycle, of a wheel upon the shaft, a ring surrounding the wheel, friction-plates at opposite sides of the wheel and leather or similar material intervening, and screws for applying pressure and regulating the friction between the parts, substantially as set forth.

8. The combination in a vehicle with the driving-shaft and driven wheel, of a ring and a support for the same, plates at opposite sides of the ring and mechanism for tightening the plates upon the sides of the ring to produce a continuous uniform pressure and friction between the parts to operate as a brake to the vehicle when the movement of the driving-shaft is arrested, substantially as set forth.

Signed by us this 23d day of May, 1896.

F. ECAUBERT.
HAROLD SERRELL.

Witnesses:
GEO. T. PINCKNEY,
S. T. HAVILAND.